United States Patent
Lin et al.

(10) Patent No.: US 7,818,000 B2
(45) Date of Patent: Oct. 19, 2010

(54) SELECTION OF A PREFERRED WIRELESS NETWORK BASED ON THE NUMBER OF REGISTRATION MESSAGES RECEIVED

(75) Inventors: Yuhui J. Lin, Naperville, IL (US); Jiten A. Shah, Naperville, IL (US); Alok Sharma, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 191 days.

(21) Appl. No.: 11/421,810

(22) Filed: Jun. 2, 2006

(65) Prior Publication Data
US 2007/0281694 A1      Dec. 6, 2007

(51) Int. Cl.
*H04W 4/00*    (2009.01)
(52) U.S. Cl. .................................. 455/433; 455/435.2
(58) Field of Classification Search ................ 455/432, 455/432.1–3, 422.1, 439, 435.1–3, 433
See application file for complete search history.

(56) References Cited

U.S. PATENT DOCUMENTS

| | | | | |
|---|---|---|---|---|
| 5,819,178 A | * | 10/1998 | Cropper | 455/433 |
| 6,526,273 B1 | * | 2/2003 | Link et al. | 455/406 |
| 7,139,570 B2 | * | 11/2006 | Elkarat et al. | 455/432.3 |
| 2006/0094423 A1 | * | 5/2006 | Sharma et al. | 455/433 |
| 2006/0161626 A1 | * | 7/2006 | Cardina et al. | 709/206 |

* cited by examiner

Primary Examiner—Huy Phan
Assistant Examiner—Vladimir Magloire
(74) Attorney, Agent, or Firm—Duft Bornsen & Fishman, LLP

(57) ABSTRACT

Systems and methods are disclosed for selecting a preferred foreign wireless network from a plurality foreign wireless networks. One embodiment of the invention comprises a home wireless network that includes an HLR and a managed roaming system coupled between the HLR and a plurality of foreign wireless networks. The managed roaming system receives registration messages for roaming subscribers being transmitted from the foreign wireless networks to the HLR. The managed roaming system monitors the number of registration messages received from the foreign wireless networks and forwards the registration messages to the HLR. The managed roaming system selects a preferred foreign wireless network based on the number of registration messages received from the foreign wireless networks over a time period. The managed roaming system then forwards subsequent registration messages from the preferred foreign wireless network to the HLR, and blocks registration messages from non-preferred foreign wireless networks.

18 Claims, 5 Drawing Sheets

SELECTION OF A PREFERRED WIRELESS NETWORK BASED ON THE NUMBER OF REGISTRATION MESSAGES RECEIVED

BACKGROUND OF THE INVENTION

1. Field of the Invention

The invention is related to the field of communication networks and, in particular, to providing systems and methods that select a preferred foreign wireless network based on the number of roaming subscribers serviced by the foreign wireless network.

2. Statement of the Problem

A wireless network of a service provider includes a plurality of base stations, a plurality of Mobile Switching Centers (MSC), and one or more Home Location Registers (HLR). The base stations of the wireless network form the service area of the wireless network. The number of base stations operated (owned or leased) by the service provider determines the size of the service area. When a subscriber is located in the service area of the wireless network, the mobile device of the subscriber registers with the wireless network through one or more base stations in range of the mobile device. To register, the mobile device transmits a registration message that is received by a base station and is forwarded to an MSC serving the area (serving-MSC). The MSC then transmits a location update message to the HLR having a subscriber profile for the subscriber. The subscriber profile includes a real-time location of the subscriber. The HLR responds with an acknowledgement message to the serving-MSC.

The wireless network as described above has a limited service area that does not cover every location where the subscriber may travel. One such instance is when a subscriber travels to a foreign country where the service provider does not have a presence. To provide wireless service to subscribers who are roaming in areas not covered by the wireless network of the service provider (referred to as the home wireless network), the service provider will often contract with the other service providers (referred to as foreign service providers) having wireless networks (referred to as foreign wireless networks) to provide service in areas where the home wireless network is not able to provide service. If the mobile subscriber is roaming in a foreign wireless network and registers with an MSC in the foreign wireless network, then the serving-MSC in the foreign wireless network transmits a location update message to the HLR of the home wireless network. The HLR responds to the serving-MSC with an acknowledgement message and subscriber data allowing the serving-MSC to provide service to the mobile device. The serving-MSC stores subscriber data in a Visitor Location Register (VLR) as long as the mobile device remains an active roamer in the service area of the serving-MSC.

There may be many different foreign wireless networks and associated foreign service providers that are serving the areas not covered by the home wireless network. One problem for service providers is deciding which foreign service providers to contract with to provide the service in the uncovered areas. The home service provider may contract with multiple foreign service providers at first meaning that no one foreign service provider is preferred over the others. The mobile device of a roaming subscriber may register with any of the foreign service providers depending on how the mobile device is provisioned.

Over time a service provider may select one of the foreign service providers as a preferred foreign service provider based on the roaming rates that can be negotiated with the foreign service provider, and the size of the coverage area of the foreign service provider. If a preferred foreign service provider is selected, then the home service provider desires to have its subscribers register with the preferred foreign wireless network when roaming in certain areas. To accomplish this goal, the home service provider can configure a preferred roaming list (PRL) in its mobile devices with information on the preferred foreign wireless network. The PRL is a list of system identification numbers (SIDs) to permit roaming on other wireless networks. The mobile device will try to locate one of the foreign wireless networks on the PRL first when the home wireless network is unavailable.

One problem with the present methods of selecting a preferred foreign wireless-network for a particular area is that the preferred foreign wireless networks are selected based on roaming rates and coverage areas. Unfortunately, the foreign wireless network with the lowest roaming rates and the largest coverage area may not be the best selection for the preferred foreign wireless network for that area as other foreign wireless networks serving the roughly the same area may be able to serve more roaming mobile devices at any given time. Thus, the home service provider may not be selecting the foreign wireless network that can provide service to the largest number of roaming subscribers.

SUMMARY OF THE SOLUTION

The invention solves the above and other problems by providing systems and methods that dynamically select one of a plurality of foreign wireless networks as a preferred foreign wireless network based on the number of roaming subscribers being served by each of the foreign wireless networks. A service provider may advantageously obtain a usage-based selection of the preferred foreign wireless network instead of relying merely on negotiated roaming rates and coverage areas for the selection of the preferred foreign wireless network. Because the preferred foreign wireless network is selected based on actual usage by roaming subscribers, the service provider is able to provide service to more roaming subscribers through the preferred foreign wireless network and realize more of a profit on roaming calls.

One embodiment of the invention comprises a home wireless network that includes an HLR and a managed roaming system. The managed roaming system is coupled between the HLR and a plurality of foreign wireless networks, wherein the foreign wireless networks are able to provide wireless service in areas not served by the home wireless network. The managed roaming system is adapted to receive registration messages for roaming subscribers being transmitted from the foreign wireless networks to the HLR. The managed roaming system is further adapted to monitor the number of registration messages received from the foreign wireless networks and forward the registration messages to the HLR. The managed roaming system is further adapted to select a preferred foreign wireless network from the plurality of foreign wireless networks based on the number of registration messages received from the foreign wireless networks over a time period.

Responsive to receiving a subsequent registration message being transmitted from one of the foreign wireless networks to the HLR, the managed roaming system is further adapted to determine if the subsequent registration message was received from the preferred foreign wireless network. The managed roaming system is further adapted to forward the subsequent registration message to the HLR if the subsequent registration message was received from the preferred foreign wireless network. The managed roaming system is further adapted to block the subsequent registration message from the HLR if the subsequent registration message was received from a non-preferred foreign wireless network.

The managed roaming system may be further adapted to receive another subsequent registration message from a non-preferred foreign wireless network for a mobile device of roaming subscriber. Responsive to receiving this registration message, the managed roaming system may be further adapted to transmit a control message to the mobile device, wherein the control message is adapted to add the preferred foreign wireless network to a preferred roaming list (PRL) in the mobile device. The mobile device will consequently try to access the preferred foreign wireless network first based on the PRL.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
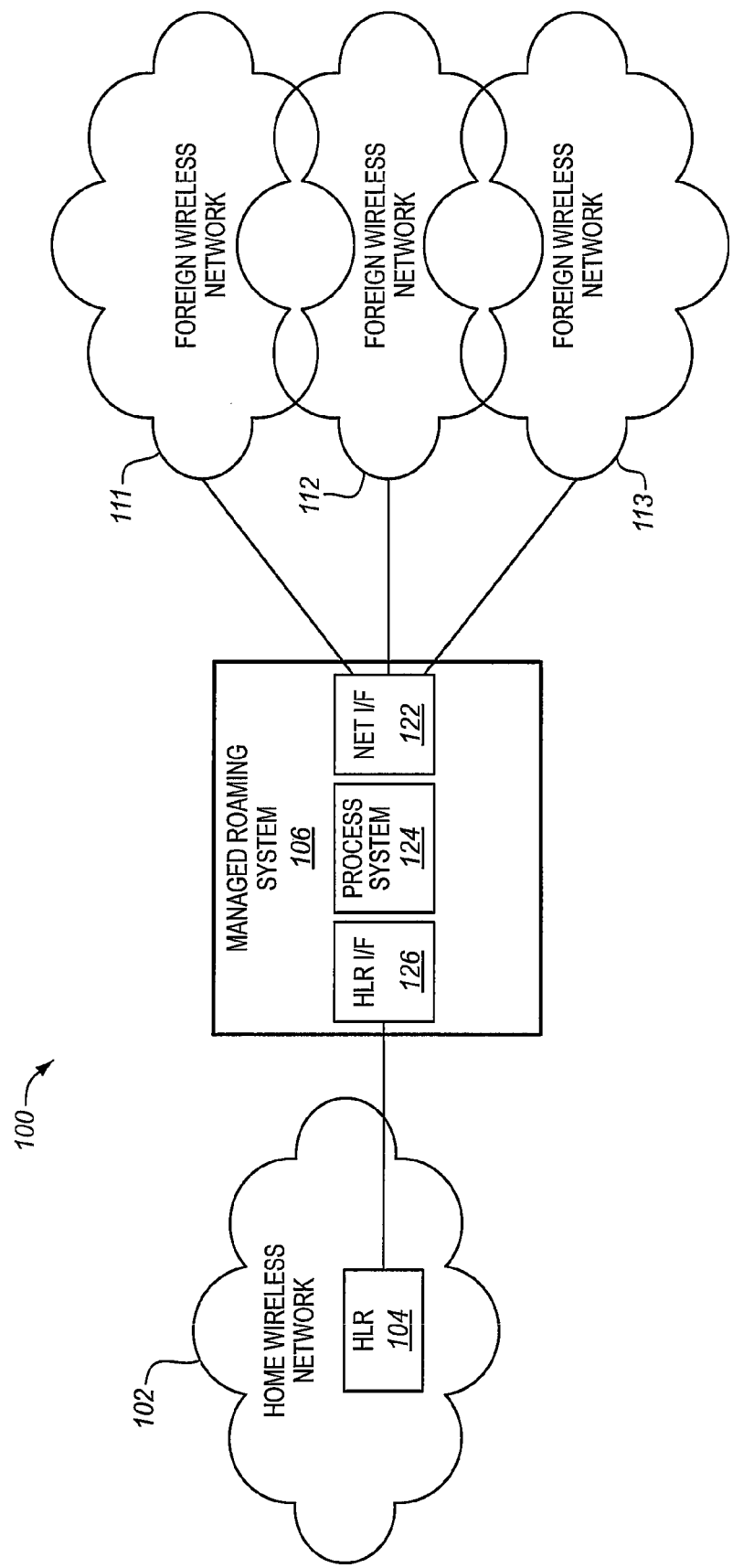
FIG. 1 illustrates a communication system in an exemplary embodiment of the invention.

FIG. 1 illustrates a communication system 100 in an exemplary embodiment of the invention. Communication system 100 includes a home wireless network 102 comprising a home location register (HLR) 104. Home wireless network 102 represents a network or multiple networks of a service provider offering wireless service to a plurality of subscribers (not shown). One or more of the subscribers may roam to areas not covered by the service area of home wireless network 102, and become roaming subscribers. At least one of the areas not covered by the service area of home wireless network 102 is covered by one or more of foreign wireless networks 111-113 as shown in communication system 100. A foreign wireless network comprises any wireless network adapted to provide service to roaming subscribers of home wireless network 102 outside of the coverage area of home wireless network 102. Foreign wireless networks 111-113 may be located in a foreign country or countries in relation to home wireless network 102, or may be located in the same country. The network clouds representing foreign wireless networks 111-113 are not intended to illustrate the actual coverage areas of the foreign wireless networks 111-113. The coverage areas of any of foreign wireless networks 111-113 may overlap in part or in whole, or may be separate from one another.

Communication system 100 also includes a managed roaming system 106 connected between HLR 104 and foreign wireless networks 111-113. Managed roaming system 106 may be considered part of home wireless network 102, or may be an independent element. Managed roaming system 106 is adapted to receive messages from foreign wireless networks 111-113 destined from HLR 104, such as registration messages for mobile devices of roaming subscribers attempting to register with the foreign wireless networks 111-113. Managed roaming system 106 may include a network interface (NET I/F) 122, a processing system 124, and an HLR interface (I/F) 126. Managed roaming system 106 may have other configurations in other embodiments.

Figure 2:
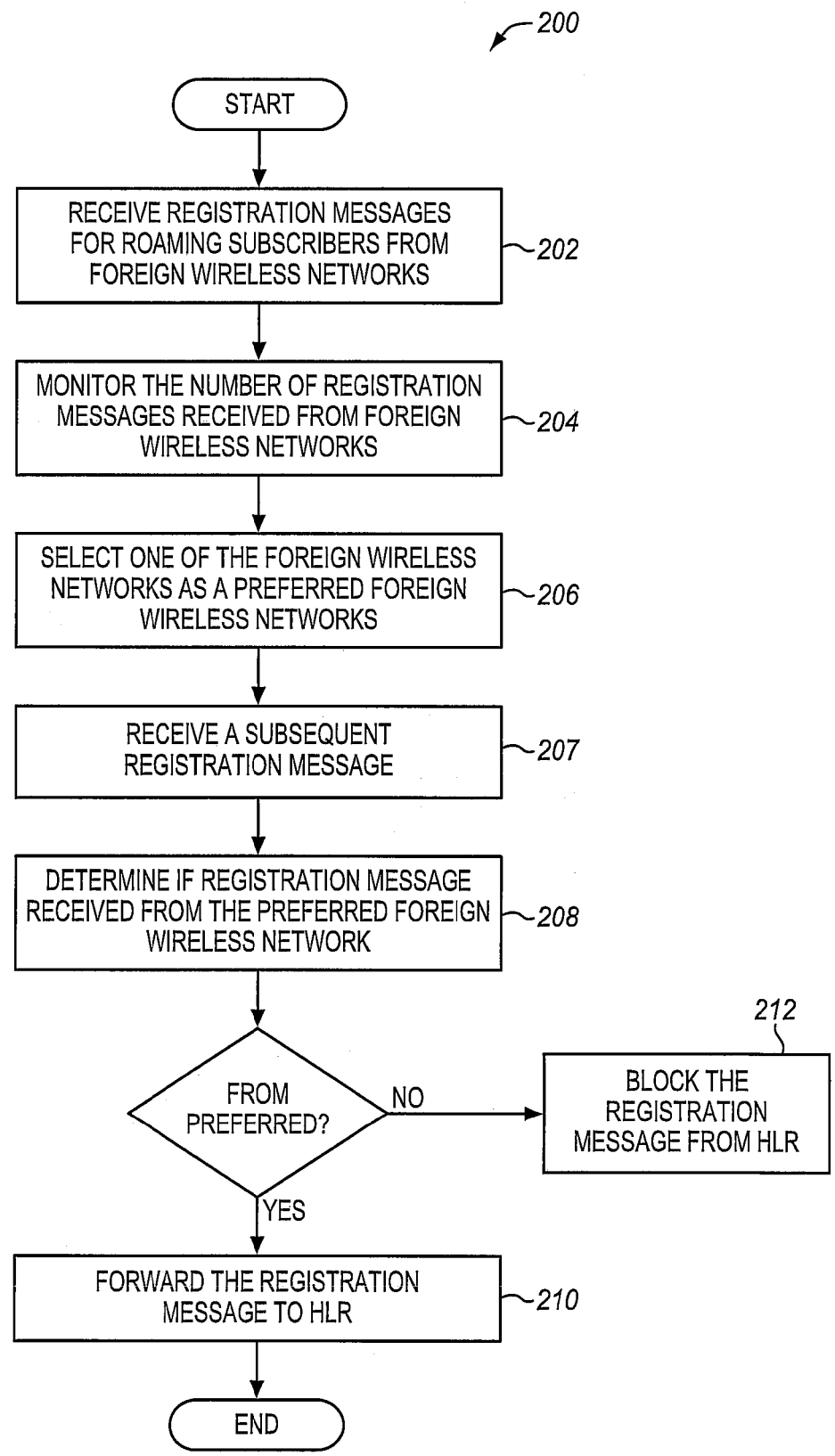
FIG. 2 is a flow chart illustrating a method of selecting the preferred foreign wireless network in an exemplary embodiment of the invention.

According to features and aspects herein, managed roaming system 106 is adapted to select one of the foreign wireless networks 111-113 as a preferred foreign wireless network. FIG. 2 is a flow chart illustrating a method 200 of selecting the preferred foreign wireless network in an exemplary embodiment of the invention. The steps of method 200 will be described with reference to communication system 100 in FIG. 1. The steps of the flow chart in FIG. 2 are not all inclusive and may include other steps not shown.

In step 202, managed roaming system 106 receives registration messages for roaming subscribers from foreign wireless networks 111-113 through network interface 122. Registration messages comprise any messages generated by a foreign wireless network responsive to receiving a request to register from a mobile device of a roaming subscriber. The registration message may comprise a location update message or another type of message.

In step 204, processing system 124 monitors the number of registration messages received from foreign wireless networks 111-113 and forwards the registration messages to the HLR 104. Processing system 124 may count the number of registration messages received from each of the foreign wireless networks 111-113 and store the active count in a data structure for each foreign wireless network 111-113. In step 206, processing system 124 selects one of foreign wireless networks 111-113 as a preferred foreign wireless network based on the number of registration messages received from the preferred foreign wireless network over a time period. For instance, processing system 124 may identify a threshold number of registration messages for a preferred foreign wireless network. If the number of registration messages received from one of the foreign wireless networks 111-113 reaches the threshold number, then processing system 124 may select that foreign wireless network 111-113 as the preferred foreign wireless network. Processing system 124 may determine or calculate the threshold number based on the area(s) being served by the foreign wireless networks 111-113, such as in size, number of potential roaming subscribers, etc.

After a preferred foreign wireless network is selected, processing system 124 receives subsequent registration messages from foreign wireless networks 111-113 in step 207. A "subsequent" registration message comprises a message received after a preferred foreign wireless network has been selected. Responsive to receiving the subsequent registration message, processing system 124 determines if the registration message is received from the preferred foreign wireless network or from a non-preferred foreign wireless network in step 208. If the registration message is received from the preferred foreign wireless network, then processing system 124 forwards the registration message to HLR 104 in step 210. If the registration message is received from a non-preferred foreign wireless network, then processing system 124 may block the registration message from being forwarded to HLR 104 in step 212.

By forwarding the registration messages from the preferred foreign wireless network and blocking the registration messages from the non-preferred foreign wireless networks, processing system 124 is able to advantageously divert more call traffic to the preferred foreign wireless network. Processing system 124 may further divert call traffic by changing how the mobile devices of the roaming subscribers register with the foreign wireless networks 111-113. For instance, processing system 124 may transmit a control message to a mobile device of a roaming subscriber responsive to receiving a registration message for the mobile device. The control message is adapted to add the preferred foreign wireless network to a preferred roaming list (PRL) in the mobile device. The mobile device will thus try to locate the preferred foreign wireless network on the PRL first when roaming.

By selecting a preferred foreign wireless network using managed roaming system 106, the home service provider can advantageously select the preferred foreign wireless network based on the number of actual roaming subscribers accessing the foreign wireless networks 111-113. The selection by managed roaming system 106 is based on actual usage by roaming subscribers so that the home service provider need not rely merely on negotiated roaming rates and coverage areas for the selection of the preferred foreign service provider. Managed roaming system 106 can also advantageously divert traffic to the preferred foreign wireless network by controlling which registration messages get forwarded to HLR 104, and by adding the preferred foreign wireless network to the preferring roaming list (PRL) on the mobile devices of the roaming subscribers. By diverting traffic to the preferred foreign wireless network, the home service provider can possibly negotiate lower rates from the preferred foreign wireless network and more efficiently and effectively provide roaming to its subscribers.

Method 200 may be performed by a software product comprising an application stored on a storage media. The application may comprise instructions executable by processing system 124 resident on managed roaming system 106 or another system to operate as described above. Some examples of instructions are software, program code, and firmware. The instructions are operational when executed by the processing system 124 to direct the processing system 124 to operate in accordance with the invention. The term "processing system" refers to a single processing device or a group of inter-operational processing devices. Some examples of processors are computers, integrated circuits, and logic circuitry.

Figure 3:
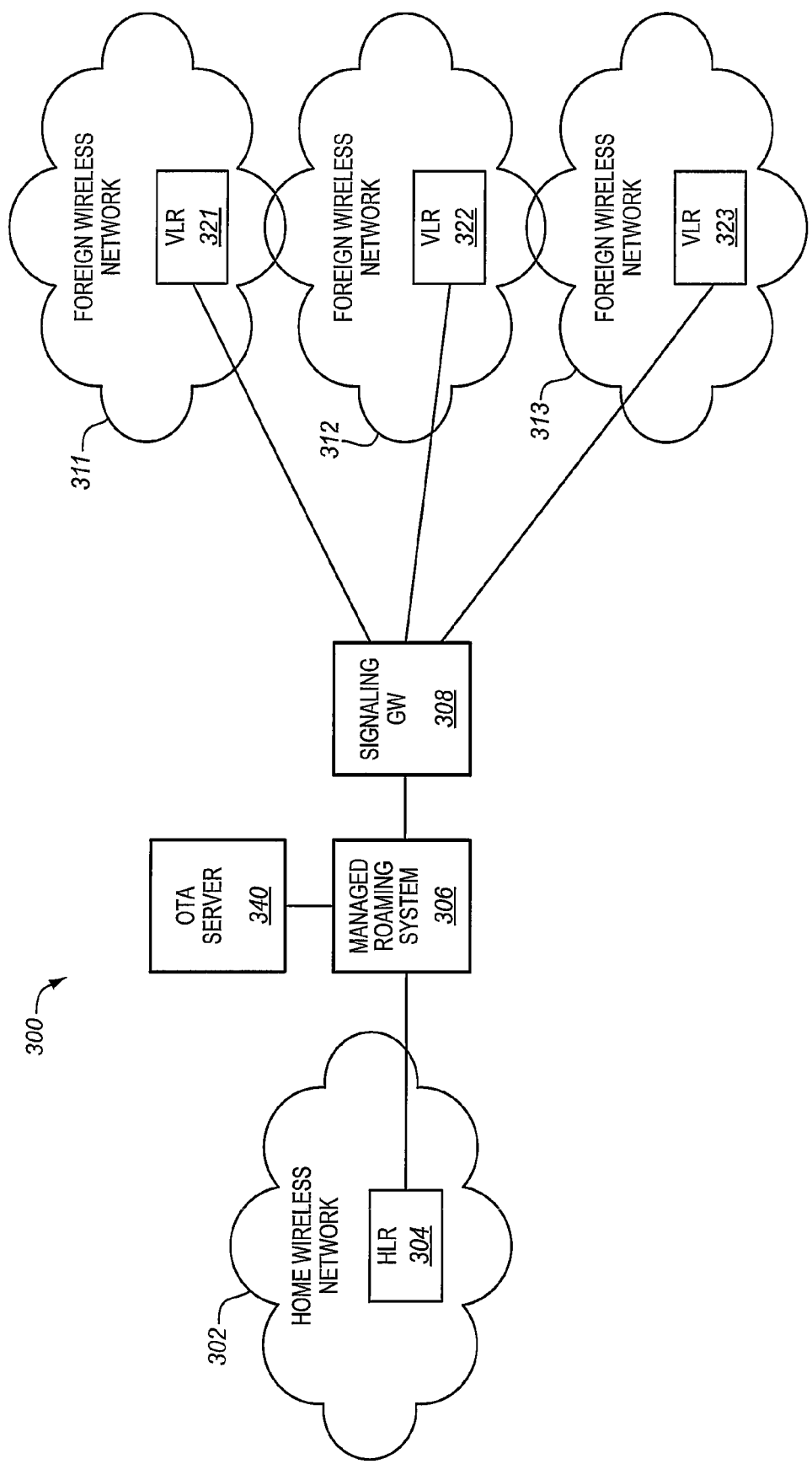
FIG. 3 illustrates another communication system in an exemplary embodiment of the invention.

FIG. 3 illustrates another communication system 300 in an exemplary embodiment of the invention. Communication system 300 again includes a home wireless network 302 comprising a home location register (HLR) 304. Communication system 300 also includes one or more foreign wireless networks 311-313. Each foreign wireless network 311-313 includes a VLR 321-323, respectively, that stores a local subscriber profile for the roaming subscribers that register with the foreign wireless networks 311-313. Each VLR 321-323 is adapted to communicate with HLR 304 of home wireless network 302 through a signaling gateway (GW) 308. In this embodiment, a managed roaming system 306 is connected between the signaling gateway 308 and the HLR 304 in order to receive registration messages being sent from VLRs 321-323 to HLR 304. Managed roaming system 306 may be connected in other areas of the communication system 300 in other embodiments.

When in operation, assume that subscribers of home wireless network 302 are roaming in foreign wireless networks 311-313. Mobile devices of the roaming subscribers are registered with the foreign wireless networks 311-313 or are attempting to register with foreign wireless networks 311-313. As part of the registration process, VLRs 321-323 transmit registration messages, which are location update messages in this embodiment, to signaling gateway 308. Signaling gateway 308 forwards the location update messages to managed roaming system 306. Due to the location of managed roaming system 306 in communication system 300, managed roaming system 306 is able to "intercept" the location update messages destined for HLR 304.

Managed roaming system 306 maintains a network table for each of the foreign wireless networks 311-313. Responsive to receiving location update messages, managed roaming system 306 monitors the number of location update messages received from each of the foreign wireless networks 311-313. Managed roaming system 306 maintains a count of the number of location update messages received from each of the foreign wireless networks 311-313 in the network table for the networks. At first, none of the foreign wireless networks 311-313 are preferred and they are all considered indifferent. Thus, managed roaming system 306 forwards the location update messages to HLR 304.

According to features and aspects herein, managed roaming system 306 is adapted to select one of the foreign wireless networks 311-313 as a preferred foreign wireless network. FIGS. 4-7 are message diagrams illustrating the messaging occurring in communication system 300 according to different scenarios.

Figure 4:
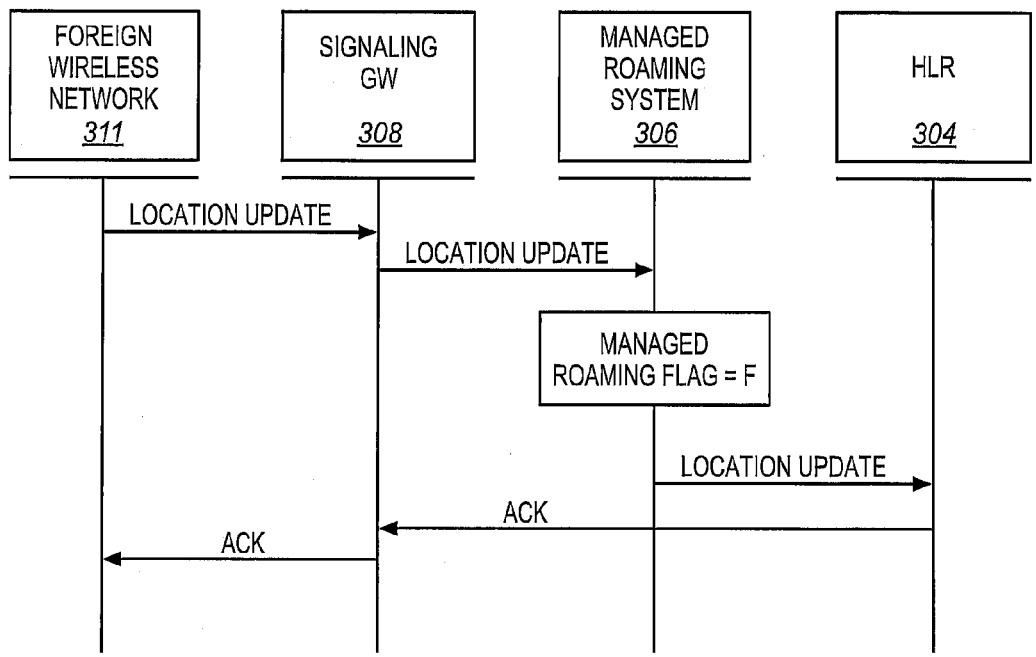
FIGS. 4-7 are message diagrams illustrating the messaging occurring in the communication system of FIG. 3 according to different scenarios.

FIG. 4 illustrates a scenario where a roaming subscriber is communicating with an indifferent network (assume foreign wireless network 311). In FIG. 4, signaling gateway 308 receives a location update message from VLR 321 in foreign wireless network 311. Responsive to receiving the location update message, signaling gateway 308 forwards the location update message to managed roaming system 306. Managed roaming system 306 identifies the network that transmitted the location update message (which is foreign wireless network 311), and updates the count for the number of location update messages received from foreign wireless network 311. Managed roaming system 306 also maintains an operation table having a managed roaming flag. If the managed roaming flag is set to false, then foreign wireless network 311 is considered indifferent (meaning that it is not preferred). Managed roaming system 306 then transmits the location update message to HLR 304. HLR 304 responds to VLR 321 in foreign wireless network 311 with an acknowledgement (ACK) message.

Figure 5:
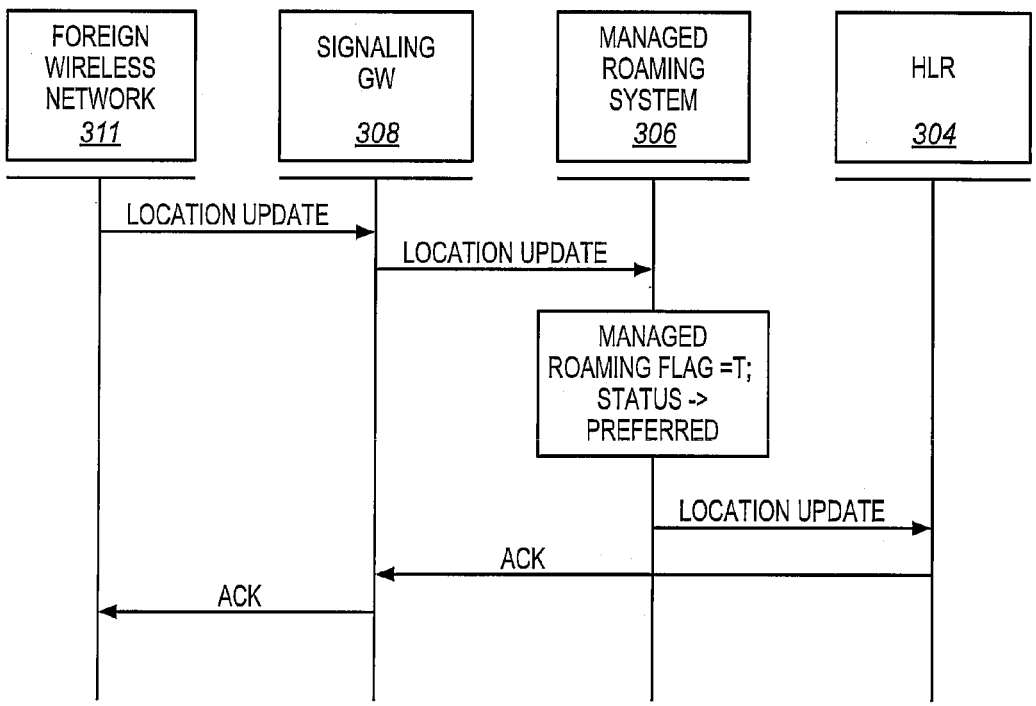

FIG. 5 illustrates a scenario where the roaming subscriber is in an indifferent network (assume foreign wireless network 311) that rises to a temporary preferred status. In FIG. 5, signaling gateway 308 receives a location update message from VLR 321 in foreign wireless network 311. Responsive to receiving the location update message, signaling gateway 308 forwards the location update message to managed roaming system 306. Managed roaming system 306 identifies the network that transmitted the location update message (which is again foreign wireless network 311), and updates the count for the number of location update messages received from foreign wireless network 311. If the count for foreign wireless network 311 reaches a count threshold, then managed roaming system 306 raises the status of foreign wireless network 311 to a temporary preferred status in its network table. Managed roaming system 306 may update a flag or another field in the network table for foreign wireless network 311 indicating its temporary preferred status. Managed roaming system 306 may also update the status of the other foreign wireless networks 312-313 indicating that these networks are not preferred.

Managed roaming system 306 may determine the count threshold based on the size of the area served by foreign wireless networks 311-313. Managed roaming system 306 may alternatively determine the count threshold based on the number of potential roaming subscribers in the area served by foreign wireless networks 311-313. For instance, if foreign wireless networks 311-313 serve a large city, then the count threshold may be higher as compared to the situation where foreign wireless networks 311-313 serve a rural area.

When foreign wireless network 311 is selected as preferred, managed roaming system 306 changes the managed roaming flag to true. When the managed roaming flag is set to true, managed roaming system 306 does not automatically forward the location update message to HLR 304. Managed roaming system 306 first determines whether the foreign wireless network 311 sending the location update message is the preferred foreign wireless network. In this case, foreign wireless network 311 is the preferred network, so managed roaming system 306 forwards the location update message to HLR 304. HLR 304 responds to the VLR 321 in foreign wireless network 311 with an acknowledgement message.

Figure 6:
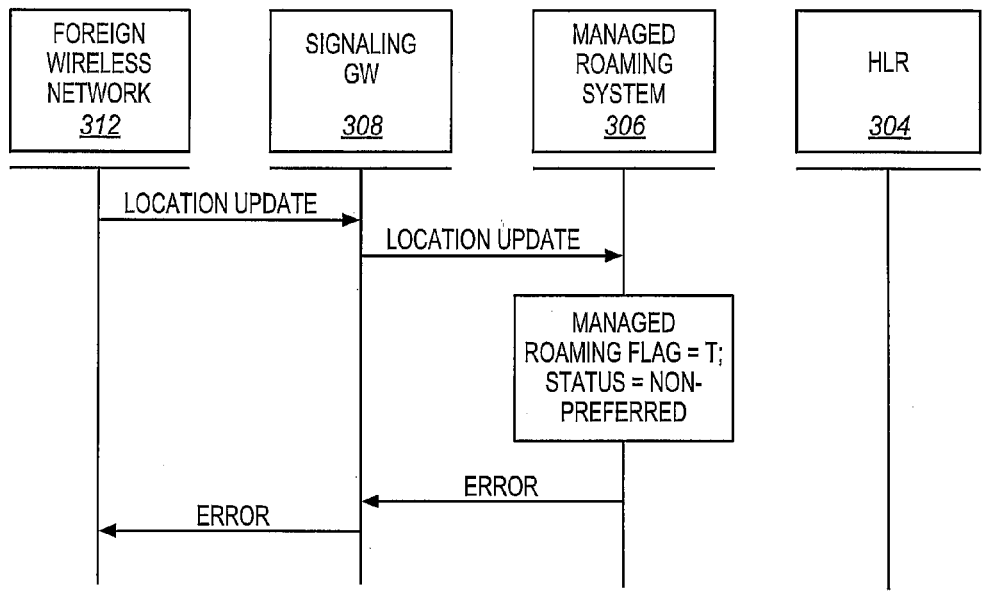

FIG. 6 illustrates a scenario where a roaming subscriber is in a non-preferred foreign wireless network 312-313. In FIG. 6, signaling gateway 308 receives a location update message from VLR 322 in foreign wireless network 312 and forwards the location update message to managed roaming system 306. Managed roaming system 306 identifies the network that transmitted the location update message (which is foreign wireless network 312), and updates a count for the number of location update messages received from foreign wireless network 312. Managed roaming system 306 determines that the managed roaming flag is set to true. When the managed roaming flag is set to true, managed roaming system 306 does not automatically forward the location update message to HLR 304. Managed roaming system 306 first determines whether the foreign wireless network 312 sending the location update message is the preferred foreign wireless network. In this case, foreign wireless network 312 is not the preferred network, so managed roaming system 306 blocks the location update message (first attempt) from HLR 304. Managed roaming system 306 may also transmit an error message to VLR 322 in foreign wireless network 312.

Figure 7:
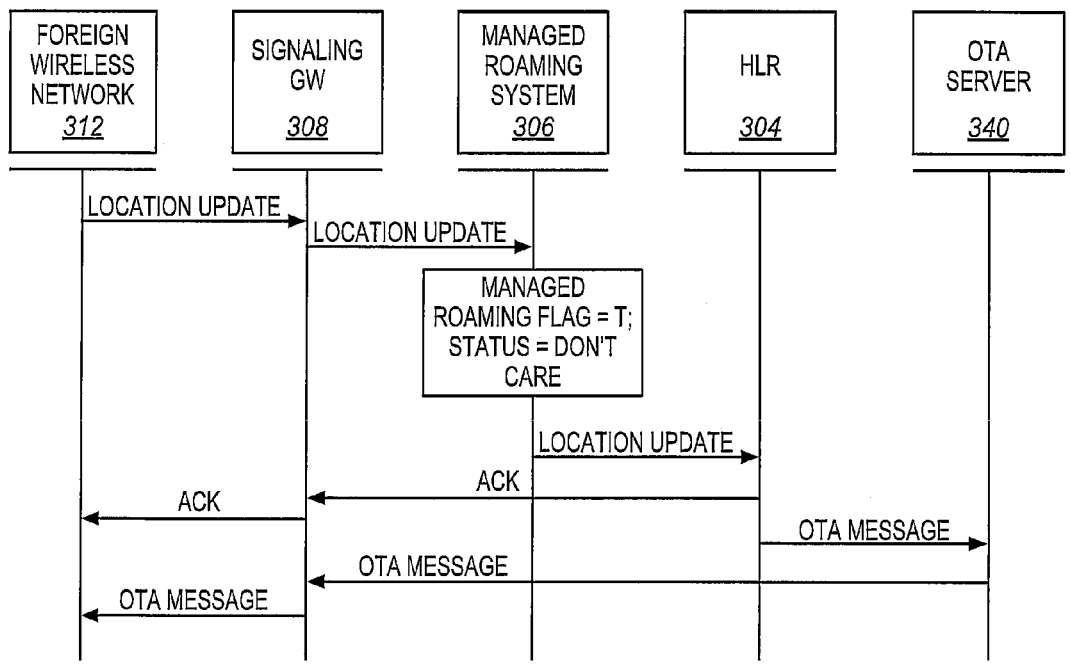

FIG. 7 illustrates a scenario where the roaming subscriber is again in a non-preferred foreign wireless network 312-313. In FIG. 7, signaling gateway 308 receives another location update message from VLR 322 in foreign wireless network 312 from the same roaming subscriber and forwards the location update message to managed roaming system 306. Managed roaming system 306 determines whether this location update message is the first attempt from a non-preferred foreign wireless network 312 for this particular roaming subscriber. Managed roaming system 306 may determine whether the present location update message is a first attempt by accessing a cache table. If the cache table stores an international mobile subscriber identity (IMSI) for the roaming subscriber, then managed roaming system 306 is able to determine that a location update message has been previously received for the roaming subscriber. If the present location update message is not the first attempt, then managed roaming system 306 may not block the location update message in all cases. Managed roaming system 306 may forward the location update message to HLR 304. HLR 304 responds to the VLR 322 in foreign wireless network 312 with an acknowledgement message.

By allowing the registration at this point, managed roaming system 306 is able to update the PRL on the mobile device of the roaming subscriber to add the preferred foreign wireless network 311 to the PRL. To update the PRL, managed roaming system 306 transmits an over the air (OTA) message to OTA server 340, wherein the OTA message comprises an update to the PRL. OTA server 340 transmits the OTA message to the mobile device of the roaming subscriber through the foreign wireless network 312 serving the mobile device. Responsive to the OTA message, the mobile device updates its PRL to add information for the preferred foreign wireless network 311.

Managed roaming system 306 may maintain counts for the number of location update messages received from each of the foreign wireless networks 311-313. Managed roaming system 306 may change the temporary preferred status of the foreign wireless networks 311-313 based on the counts changing for the foreign wireless networks 311-313. Managed roaming system 306 may thus dynamically assign temporary preferred status to a new foreign wireless network 311-313 that is serving the most roaming subscribers.

Although specific embodiments were described herein, the scope of the invention is not limited to those specific embodiments. The scope of the invention is defined by the following claims and any equivalents thereof.

We claim:

1. A method of selecting a preferred foreign wireless network to provide service to roaming subscribers, the method comprising:
   receiving registration messages for roaming subscribers being transmitted from a plurality of foreign wireless networks to a home location register (HLR) of a home wireless network, wherein none of the foreign wireless networks are preferred over another one of the foreign wireless networks;
   monitoring the registration messages received from each of the foreign wireless networks to maintain a count of the number of registration messages received from each of the foreign wireless networks, and forwarding the registration messages to the HLR;
   selecting one of the foreign wireless networks as a preferred foreign wireless network based on the count for each of the foreign wireless networks over a time period and a threshold number of registration messages for a preferred foreign wireless network;
   after selecting the preferred foreign wireless network and responsive to receiving a subsequent registration message transmitted from one of the foreign wireless networks to the HLR, the method further comprises:
   determining if the subsequent registration message was received from the preferred foreign wireless network; and
   forwarding the subsequent registration message to the HLR if the subsequent registration message was received from the preferred foreign wireless network.

2. The method of claim 1 further comprising: blocking the subsequent registration message from being forwarded to the HLR if the subsequent registration message was received from a non-preferred foreign wireless network.

3. The method of claim 1 further comprising: receiving another subsequent registration message from a non-preferred foreign wireless network for a mobile device of roaming subscriber; and transmitting a control message to the mobile device, wherein the control message is adapted to add the preferred foreign wireless network to a preferred roaming list in the mobile device.

4. The method of claim 3 wherein the control message comprises an over the air (OTA) message.

5. The method of claim 1 wherein the registration messages comprise location update messages.

6. The method of claim 1 further comprising:
determining the threshold number based on the size of the area being served by the foreign wireless networks.

7. The method of claim 1 wherein the foreign wireless networks are located in a foreign country as compared to the home wireless network.

8. A home wireless network, comprising: a managed roaming system coupled between a home location register (HLR) and a plurality of foreign wireless networks, the managed roaming system being adapted to:
receive registration messages for roaming subscribers being transmitted from the foreign wireless networks to the HLR, wherein none of the foreign wireless networks are preferred over another one of the foreign wireless networks;
monitor the registration messages received from each of the foreign wireless networks to maintain a count of the number of registration messages received from each of the foreign wireless networks, and forward the registration messages to the HLR;
select one of the foreign wireless networks as a preferred foreign wireless network based on the count for each of the foreign wireless networks over a time period and a threshold number of registration messages for a preferred foreign wireless network;
after selection of the preferred foreign wireless network and responsive to receiving a subsequent registration message transmitted from one of the foreign wireless networks to the HLR, the managed roaming system is further adapted to:
determine if the subsequent registration message was received from the preferred foreign wireless network; and
forward the subsequent registration message to the HLR if the subsequent registration message was received from the preferred foreign wireless network.

9. The home wireless network of claim 8 wherein the managed roaming system is further adapted to:
block the subsequent registration message from being forwarded to the HLR if the subsequent registration message was received from a non-preferred foreign wireless network.

10. The home wireless network of claim 8 wherein the managed roaming system is further adapted to:
receive another subsequent registration message from a non-preferred foreign wireless network for a mobile device of roaming subscriber; and
transmit a control message to the mobile device, wherein the control message is adapted to add the preferred foreign wireless network to a preferred roaming list in the mobile device.

11. The home wireless network of claim 10 wherein control message comprises an over the air (OTA) message.

12. The home wireless network of claim 8 wherein the registration messages comprise location update messages.

13. The home wireless network of claim 8 wherein the managed roaming system is further adapted to:
determine the threshold number based on the size of the area being served by the foreign wireless networks.

14. The home wireless network of claim 8 wherein the foreign wireless networks are located in a foreign country as compared to the home wireless network.

15. A managed roaming system, comprising:
a home location register (HLR) interface adapted to communicate with an HLR in a home wireless network;
a network interface adapted to communicate with a plurality of foreign wireless networks; and
a processing system adapted to:
receive registration messages through the network interface, wherein the registration messages are for roaming subscribers that are being transmitted from the foreign wireless networks to the HLR, wherein none of the foreign wireless networks are preferred over another one of the foreign wireless networks;
monitor the registration messages received from each of the foreign wireless networks to maintain a count of the number of registration messages received from each of the foreign wireless networks, and forward the registration messages to the HLR through the HLR interface; and
select one of the foreign wireless networks as a preferred foreign wireless network based on the count for each of the foreign wireless networks over a time period and a threshold number of registration messages for a preferred foreign wireless network.

16. The managed roaming system of claim 15 wherein the processing system is further adapted to:
receive a subsequent registration message through the network interface, wherein the subsequent registration message is being transmitted from one of the foreign wireless networks to the HLR;
determine if the subsequent registration message was received from the preferred foreign wireless network; and
forward the subsequent registration message to the HLR through the HLR interface if the subsequent registration message was received from the preferred foreign wireless network.

17. The managed roaming system of claim 16 wherein the processing system is further adapted to:
block the subsequent registration message from being forwarded to the HLR if the subsequent registration message was received from a non-preferred foreign wireless network.

18. The managed roaming system of claim 15 wherein the processing system is further adapted to:
receive another subsequent registration message through the network interface, wherein the other subsequent registration message was received from a non-preferred foreign wireless network for a mobile device of roaming subscriber; and
transmit a control message to the mobile device, wherein the control message is adapted to add the preferred foreign wireless network to a preferred roaming list in the mobile device.

* * * * *